US011493226B2

(12) United States Patent
Nakano et al.

(10) Patent No.: US 11,493,226 B2
(45) Date of Patent: Nov. 8, 2022

(54) AIRCONDITIONING APPARATUS

(71) Applicant: Daikin Industries, LTD., Osaka (JP)

(72) Inventors: Akihiro Nakano, Osaka (JP); Takeshi Yamakawa, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 222 days.

(21) Appl. No.: 16/628,201

(22) PCT Filed: Jul. 25, 2018

(86) PCT No.: PCT/JP2018/027938
§ 371 (c)(1),
(2) Date: Jan. 2, 2020

(87) PCT Pub. No.: WO2019/026731
PCT Pub. Date: Feb. 7, 2019

(65) Prior Publication Data
US 2020/0149774 A1 May 14, 2020

(30) Foreign Application Priority Data
Jul. 31, 2017 (JP) .............................. JP2017-147872

(51) Int. Cl.
*F24F 11/81* (2018.01)
*F24F 3/06* (2006.01)
(Continued)

(52) U.S. Cl.
CPC ................ *F24F 11/81* (2018.01); *F24F 3/06* (2013.01); *F24F 13/06* (2013.01); *F24F 2003/003* (2013.01)

(58) Field of Classification Search
CPC .. F24F 3/06; F24F 13/06; F24F 1/0007; F24F 11/83; F24F 11/86; F25B 2313/0293;
(Continued)

(56) References Cited

U.S. PATENT DOCUMENTS

2016/0238268 A1* 8/2016 Nishimura .............. F24F 3/065

FOREIGN PATENT DOCUMENTS

EP 2667103 A1 11/2013
JP 60-253754 A 12/1985
(Continued)

OTHER PUBLICATIONS

International Preliminary Report on Patentability, and Written Opinion of the International Searching Authority, dated Feb. 13, 2020, for International Application No. PCT/JP2018/027938, with an English translation.
(Continued)

*Primary Examiner* — Lionel Nouketcha
(74) *Attorney, Agent, or Firm* — Birch, Stewart, Kolasch & Birch, LLP

(57) ABSTRACT

Provided is an air conditioning apparatus that sufficiently raises the temperature of hot air to be blown out when receiving a request for high-temperature air temporarily raising the temperature of the hot air. A first use side unit includes a first use side heat exchanger and a first use side fan. A second use side unit includes a second use side heat exchanger and a second use side fan. When the first use side unit receives a request for the high-temperature air and the second use side unit receives no request for the high-temperature air, the air conditioning apparatus shifts to a mode that performs control to reduce the airflow volume of the second use side fan or make the airflow volume of the second use side fan zero such as reducing the number of revolutions of the second use side fan in another room by 40 rpm.

10 Claims, 8 Drawing Sheets

(51) Int. Cl.
*F24F 13/06* (2006.01)
*F24F 3/00* (2006.01)

(58) Field of Classification Search
CPC ...... F25B 2313/0314; F25B 2313/0315; F25B 2600/0253; F25B 2600/2513
See application file for complete search history.

(56) References Cited

FOREIGN PATENT DOCUMENTS

| | | |
|---|---|---|
| JP | 4-4645 U | 1/1992 |
| JP | 5-223332 A | 8/1993 |
| JP | 2010-54118 A | 3/2010 |
| JP | 2012-149836 A | 8/2012 |
| JP | 2016-114286 A | 6/2016 |

OTHER PUBLICATIONS

International Search Report, dated Oct. 9, 2018, for International Application No. PCT/JP2018/027938, with an English translation.
Extended European Search Report, dated Jul. 22, 2020, for European Application No. 18841017.9.

* cited by examiner

AIRCONDITIONING APPARATUS

TECHNICAL FIELD

The present invention relates to an air conditioning apparatus and, in particular, to an air conditioning apparatus having a heating function.

BACKGROUND ART

Conventionally, there has been a case where a user wants to warm himself or herself up with hot air having the highest possible temperature when entering a room from cold outside under the condition where a heating operation is performed in an air conditioning apparatus. For example, Patent Literature 1 (JP 4-4645 Y) discloses a technique that prevents a user from feeling a sense of cold air by maximizing an operation frequency of a compressor and setting the number of revolutions of an indoor-side fan to "low" when an operating mode is set to a "high temperature air blowing mode" that is, a request to temporarily blow out hot air having a high temperature is made.

SUMMARY OF THE INVENTION

Technical Problem

However, as described in Patent Literature 1, merely maximizing the operation frequency of the compressor and reducing the number of revolutions of the indoor-side fan cannot sufficiently raise the temperature of hot air blown to a user in some cases.

It is an object of the present invention to provide an air conditioning apparatus capable of sufficiently raising the temperature of hot air to be blown out when receiving a request for high-temperature air temporarily raising the temperature of the hot air.

Solution to Problem

An air conditioning apparatus according to a first aspect of the present invention includes a first use side unit including a first use side heat exchanger and a first use side fan configured to send air in a space to be air conditioned to the first use side heat exchanger; a second use side unit including a second use side heat exchanger and a second use side fan configured to send air in a space to be air conditioned to the second use side heat exchanger; a first expansion valve connected to a first refrigerant path extending through the first use side heat exchanger; a second expansion valve connected to a second refrigerant path extending through the second use side heat exchanger; a heat source side heat exchanger configured to perform heat exchange of a refrigerant flowing through the first refrigerant path and the second refrigerant path; and a compressor configured to compress the refrigerant whose heat is exchanged in the heat source side heat exchanger and discharge the compressed refrigerant to the first refrigerant path and the second refrigerant path. When the first use side unit receives a request for high-temperature air temporarily raising a temperature of hot air blown out through the first use side heat exchanger and the second use side unit receives no request for the high-temperature air, the air conditioning apparatus shifts to a mode that performs control so as to reduce an airflow volume of the second use side fan or make the airflow volume of the second use side fan zero.

When the first use side unit receives a request for high-temperature air temporarily raising the temperature of hot air blown out through the first use side heat exchanger and the second use side unit receives no request for the high-temperature air, the air conditioning apparatus according to the first aspect shifts to the mode that performs control so as to reduce the airflow volume of the second use side fan or make the airflow volume of the second use side fan zero. Thus, the amount of heat consumed in the second use side heat exchanger is reduced, and it is possible to supply a larger amount of heat to hot air whose heat is exchanged in the first use side heat exchanger and blown out.

An air conditioning apparatus according to a second aspect of the present invention is the air conditioning apparatus according to the first aspect in which the airflow volume of the second use side fan is reduced by lowering an upper limit fan tap of the second use side fan in the mode.

In the air conditioning apparatus according to the second aspect, when the upper limit fan tap is lowered, the airflow volume is reduced at the timing when the upper limit fan tap is lowered in a case where the second use side fan sends air at the fan tap higher than the lowered upper limit fan tap until the upper limit fan tap is lowered. Further, in a case where the second use side fan sends air at the tap lower than the lowered upper limit fan tap, but should exceed the upper limit fan tap lowered thereafter, it can be still considered that the airflow volume of the second use side fan is reduced. Such a configuration makes it possible to reduce the airflow volume while avoiding a sudden change and leaving a possibility capable of changing the fan tap.

An air conditioning apparatus according to a third aspect of the present invention is the air conditioning apparatus according to the first aspect in which the airflow volume of the second use side fan is reduced by reducing the number of revolutions of the second use side fan in the mode that performs control so as to reduce the airflow volume of the second use side fan or make the airflow volume of the second use side fan zero.

In the air conditioning apparatus according to the third aspect, the number of revolutions of the second use side fan is reduced, which makes it possible to immediately reduce the airflow volume of the second use side fan. Thus, it is possible to promptly concentrate the amount of heat on the first use side heat exchanger by reducing the amount of heat of the second use side heat exchanger.

An air conditioning apparatus according to a fourth aspect of the present invention is the air conditioning apparatus according to any one of the first to third aspects in which the airflow volume of the second use side fan is reduced in stages in the mode that performs control so as to reduce the airflow volume of the second use side fan or make the airflow volume of the second use side fan zero.

The air conditioning apparatus according to the fourth aspect can reduce the airflow volume of the second use side fan while avoiding a sudden change by reducing the airflow volume in stages.

An air conditioning apparatus according to a fifth aspect of the present invention is the air conditioning apparatus according to any one of the first to fourth aspects in which the airflow volume of the second use side fan is maintained when a condensation temperature of the first use side heat exchanger is not lower than a predetermined threshold in the mode that performs control so as to reduce the airflow volume of the second use side fan or make the airflow volume of the second use side fan zero.

In the air conditioning apparatus according to the fifth aspect, the airflow volume of the second use side fan is maintained when the condensation temperature of the first use side heat exchanger is not lower than the predetermined threshold. Thus, it is possible to reduce the influence on a user of the second use side unit as compared to the case where the airflow volume of the second use side fan is not maintained, but lowered.

An air conditioning apparatus according to a sixth aspect of the present invention is the air conditioning apparatus according to any one of the first to fifth aspects in which, when a request for the high-temperature air is received, a turnoff condition of a heating operation using the second refrigerant path is changed so as to facilitate becoming in an off-state of the heating operation using the second refrigerant path where no request for the high-temperature air is made in the mode that performs control so as to reduce the airflow volume of the second use side fan or make the airflow volume of the second use side fan zero.

In the air conditioning apparatus according to the sixth aspect, when the turnoff condition is changed so as to facilitate becoming in the off-state of the heating operation using the second refrigerant path where no request for the high-temperature air is made, the off period of the heating operation using the second refrigerant path is increased to facilitate the accumulation of the liquid refrigerant in the second refrigerant path.

An air conditioning apparatus according to a seventh aspect of the present invention is the air conditioning apparatus according to any one of the first to sixth aspects in which in the mode that performs control so as to reduce the airflow volume of the second use side fan or make the airflow volume of the second use side fan zero, the heating operation using the second refrigerant path where no request for the high-temperature air is made is preferentially in the off-state of operation, and the airflow volume of the second use side fan in the second refrigerant path not in the off-state of operation is reduced.

In the air conditioning apparatus according to the seventh aspect, the heating operation using the second refrigerant path where no request for the high-temperature air is made is preferentially in the off-state of operation, which stops the second use side fan of the second use side unit in the off-state of operation to make the airflow volume of the second use side fan zero. This makes it easy to obtain an effect of controlling the airflow volume of the second use side fan to raise the temperature of the refrigerant in the first use side heat exchanger.

An air conditioning apparatus according to an eighth aspect of the present invention is the air conditioning apparatus according to any one of the first to seventh aspects in which control for making an airflow volume of the first use side fan equal to or less than a predetermined value is performed when a request for the high-temperature air is received.

In the air conditioning apparatus according to the eighth aspect, when a request for the high-temperature air is received, the airflow volume of the first use side fan is made equal to or less than the predetermined value. Accordingly, the amount of air passing through the first use side heat exchanger per unit time is reduced as compared to the case where the airflow volume exceeds the predetermined value, which increases the amount of heat received by air per unit volume.

An air conditioning apparatus according to a ninth aspect of the present invention is the air conditioning apparatus according to any one of the first to eighth aspects in which control for increasing the number of revolutions of the compressor to increase a flow rate of the refrigerant flowing through the first use side heat exchanger is performed when a request for the high-temperature air is received.

In the air conditioning apparatus according to the ninth aspect, when a request for the high-temperature air is received, the number of revolutions of the compressor is increased to increase the flow rate of the refrigerant flowing through the first use side heat exchanger. Thus, it is possible to supply a larger amount of heat from the refrigerant to air passing through the first use side heat exchanger, combined with a rise in the temperature of the refrigerant flowing through the first use side heat exchanger by a change of the control of the first expansion valve.

An air conditioning apparatus according to a tenth aspect of the present invention is the air conditioning apparatus according to any one of the first to sixth aspects in which control for lowering a target degree of subcooling to increase a superheated region occupied by a gas refrigerant in the first use side heat exchanger is performed when a request for the high-temperature air is received.

In the air conditioning apparatus according to the tenth aspect, when a request for the high-temperature air is received, the valve opening degree of the first expansion valve is reduced by lowering the target degree of subcooling, which increases the superheated region occupied by the gas refrigerant in the first use side heat exchanger. Thus, the ratio of the high-temperature gas refrigerant is increased in the first use side heat exchanger.

Advantageous Effects of Invention

The air conditioning apparatus according to the first or third aspect can sufficiently raise the temperature of hot air blown out of the first use side heat exchanger which receives a request for the high-temperature air.

The air conditioning apparatus according to the second aspect can prevent reduction in the comfort caused by the difference in airflow volume control by bringing the control of the airflow volume of the second use side fan close to normal control.

The air conditioning apparatus according to the fourth or fifth aspect can prevent reduction in the comfort caused by difficulty in raising the temperature in the heating operation of the second use side unit.

The air conditioning apparatus according to the sixth aspect can appropriately distribute the refrigerant of the air conditioning apparatus even when the subcooled region is reduced and the superheated region is increased in the first use side heat exchanger in the first refrigerant path and can thus maintain an efficient operation state.

The air conditioning apparatus according to the seventh aspect can accelerate a rise in the temperature of hot air blown out of the first use side heat exchanger.

The air conditioning apparatus according to the eighth, ninth, or tenth aspect can increase the amount of heat received by air passing through the first use side heat exchanger to sufficiently raise the temperature of hot air.

DESCRIPTION OF EMBODIMENTS (1) Configuration

Figure 1:
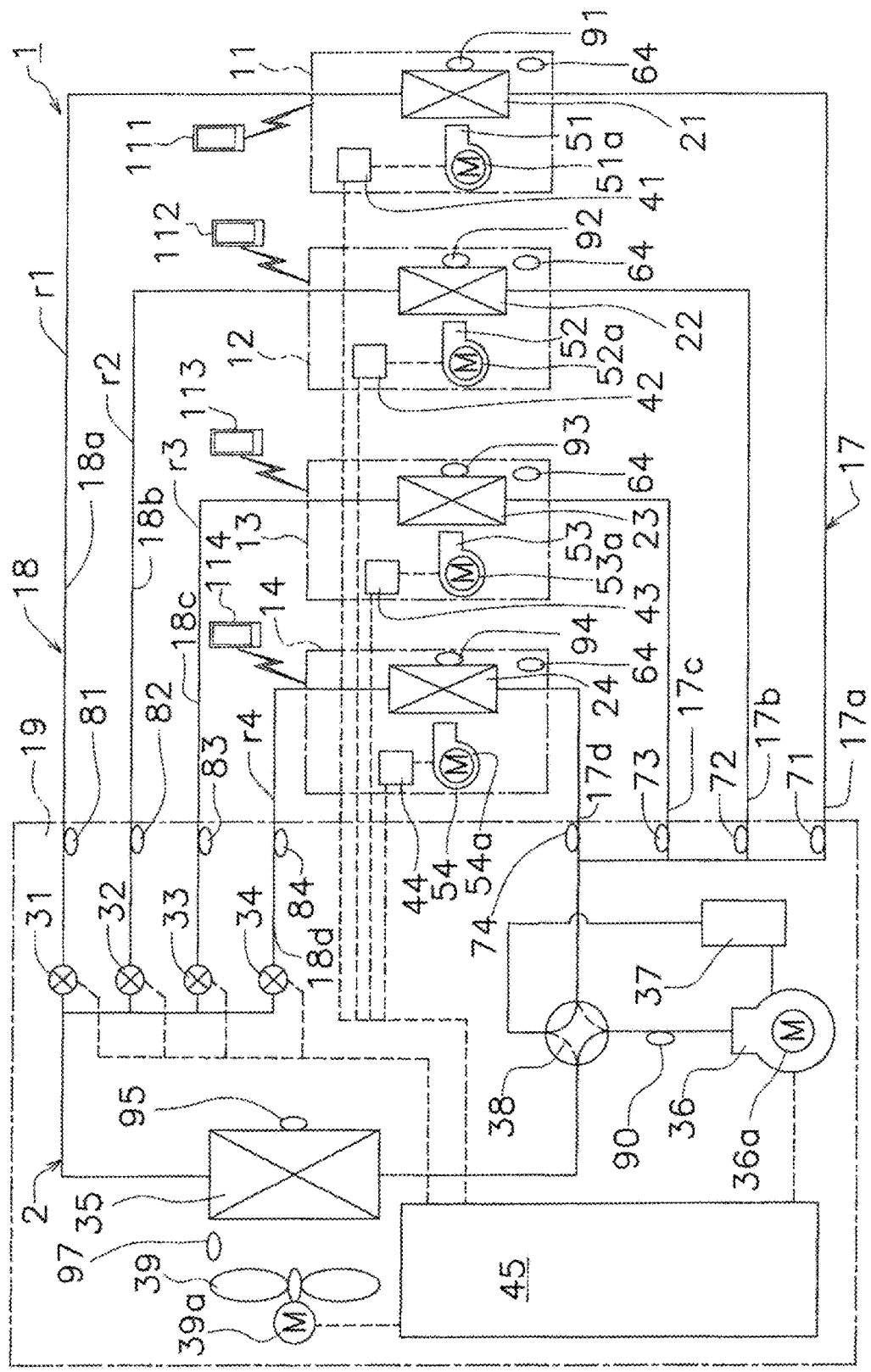
FIG. 1 is a refrigerant circuit diagram illustrating an air conditioning apparatus according to an embodiment of the present invention.

FIG. 1 illustrates a refrigerant circuit of an air conditioning apparatus according to an embodiment of the present invention. The air conditioning apparatus 1 is a multi-room air conditioning apparatus and has a configuration in which indoor units 11, 12, 13, 14 as a plurality of use side units are connected in parallel to an outdoor unit 19 as a single heat source side unit. The outdoor unit 19 houses a compressor 36, an accumulator 37, a four-way switching valve 38, an outdoor heat exchanger 35 as a heat source side heat exchanger, expansion valves 31, 32, 33, 34, and an outdoor fan 39 as a heat source side fan therein. The indoor units 11, 12, 13, 14 respectively house indoor heat exchangers 21, 22, 23, 24 as use side heat exchangers and indoor fans 51, 52, 53, 54 as use side fans therein.

The compressor 36 is configured in such a manner that the number of revolutions thereof can be controlled by a control unit 40 (described later). The compressor 36 is a device which compresses a low-pressure refrigerant in a refrigeration cycle until the refrigerant becomes a high-pressure refrigerant. The compressor 36 is a displacement compressor which is driven to rotate by a compressor motor 36a whose frequency can be controlled by an inverter. The outdoor fan 39 is driven by an outdoor fan motor 39a whose number of revolutions can be controlled by the control unit 40. The outdoor fan 39 is, for example, a propeller fan and capable of changing an airflow volume by changing the number of revolutions. The expansion valves 31 to 34 are controlled by the control unit 40 in such a manner that valve opening degrees of the respective expansion valves 31 to 34 are individually changed. The indoor fans 51, 52, 53, 54 are respectively driven by indoor fan motors 51a, 52a, 53a, 54a whose number of revolutions can be controlled by the control unit 40. Each of the indoor fans 51 to 54 is, for example, a centrifugal fan or a multi-blade fan and capable of changing an airflow volume by changing the number of revolutions.

A refrigerant circuit 2 of the air conditioning apparatus 1 includes the compressor 36, the accumulator 37, the four-way switching valve 38, the outdoor heat exchanger 35, the expansion valves 31 to 34, and the indoor heat exchangers 21 to 24 which are connected to each other.

The refrigerant flowing through a refrigerant path r1 flows through the compressor 36, the indoor heat exchanger 21, the expansion valve 31, the outdoor heat exchanger 35, the four-way switching valve 38, and the accumulator 37. The refrigerant flowing through the refrigerant path r2 flows through compressor 36, the indoor heat exchanger 22, the expansion valve 32, the outdoor heat exchanger 35, the four-way switching valve 38, and the accumulator 37. The refrigerant flowing through the refrigerant path r3 flows through compressor 36, the indoor heat exchanger 23, the expansion valve 33, the outdoor heat exchanger 35, the four-way switching valve 38, and the accumulator 37. The refrigerant flowing through the refrigerant path r4 flows through compressor 36, the indoor heat exchanger 24, the expansion valve 34, the outdoor heat exchanger 35, the four-way switching valve 38, and the accumulator 37.

A vapor compression refrigeration cycle is performed in each of the refrigerant paths r1 to r4. For example, R32 (the composition thereof is 100% of HFC-32), which is a single refrigerant having a small global warming potential, is used as the refrigerant circulating through the refrigerant circuit 2.

Further, the four-way switching valve 38 and the indoor heat exchangers 21 to 24 are connected through a gas-refrigerant pipe 17. The expansion valves 31 to 34 and the indoor heat exchangers 21 to 24 are connected through a liquid-refrigerant pipe 18.

Further, the air conditioning apparatus 1 includes a large number of temperature sensors which include thermistors. An outdoor temperature sensor 97 detects an outdoor air temperature in an outdoor space where the outdoor unit 19 is installed. A discharge pipe temperature sensor 90 is attached to a discharge pipe of the compressor 36 and detects a discharge temperature To of the refrigerant discharged from the compressor 36. An outdoor heat-exchange temperature sensor 95 which detects an evaporation temperature in a heating operation is attached to the outdoor heat exchanger 35 as the heat source side heat exchanger and detects an evaporation temperature Te in the heating operation. Indoor heat-exchange temperature sensors 91, 92, 93, 94 are respectively attached to the indoor heat exchangers 21, 22, 23, 24 and detect condensation temperatures Tc1 to Tc4 in the heating operation. Liquid pipe temperature sensors 81, 82, 83, 84 are respectively attached to parts 18a, 18b, 18c, 18d of the liquid-refrigerant pipe 18 which extends from the outdoor heat exchanger 35 and branches to the indoor heat exchangers 21 to 24 and detect liquid pipe temperatures Tl1 to Tl4. Indoor temperature sensors 61 to 64 are respectively disposed inside the indoor units 11 to 14 so as to detect indoor temperatures Tr1 to Tr4 which are temperatures of indoor air taken into the indoor units 11 to 14. Gas pipe temperature sensors 71 to 74 are respectively attached to parts 17a, 17b, 17c, 17d of the gas-refrigerant pipe 17 which extends from the four-way switching valve 38 and branches to the indoor heat exchangers 21 to 24. The control unit 40 controls the operation of the air conditioning apparatus 1 on the basis of detection values of these temperature sensors.

(2) Operation (2-1) Flow of Refrigerant in Cooling

Next, the outline of the operation of the air conditioning apparatus 1 will be described. In the cooling operation, the four-way switching valve 38 is maintained in a state indicated by a solid line in FIG. 1. The high-temperature and high-pressure gas refrigerant discharged from the compressor 36 flows into the outdoor heat exchanger 35 through the four-way switching valve 38 and exchanges heat with outdoor air supplied by the outdoor fan 39 in the outdoor heat exchanger 35. As a result, the gas refrigerant is condensed and liquefied. The liquefied refrigerant is decompressed by the expansion valves 31 to 34 and further exchanges heat with indoor air supplied by the indoor fans 51 to 54 in the indoor heat exchangers 21 to 24. As a result, the liquefied refrigerant is evaporated. The indoor air cooled by the evaporation of the refrigerant is blown out into indoor spaces by the indoor fans 51 to 54 to cool the indoor spaces.

Further, the refrigerant evaporated and gasified in the indoor heat exchangers 21 to 24 is returned to the outdoor unit 19 through the gas-refrigerant pipe 17 and sucked into the compressor 36 through the four-way switching valve 38 and the accumulator 37.

(2-2) Flow of Refrigerant in Heating

In the heating operation, the four-way switching valve 38 is maintained in a state indicated by a broken line in FIG. 1. The high-temperature and high-pressure gas refrigerant discharged from the compressor 36 flows into the indoor heat exchangers 21 to 24 of the indoor units 11 to 14 through the four-way switching valve 38 and exchanges heat with indoor air supplied by the indoor fans 51 to 54 in the indoor heat exchangers 21 to 24. As a result, the gas refrigerant is condensed and liquefied. The indoor air heated by the condensation of the refrigerant is blown out into the indoor spaces by the indoor fans 51 to 54 to heat the indoor spaces. The refrigerant liquefied in the indoor heat exchangers 21 to 24 is returned to the outdoor unit 19 through the liquid-refrigerant pipe 18. The refrigerant returned to the outdoor unit 19 is decompressed by the expansion valves 31 to 34 and further exchanges heat with outdoor air supplied by the outdoor fan 39 in the outdoor heat exchanger 35. As a result, the refrigerant is evaporated. The refrigerant evaporated and gasified in the outdoor heat exchanger 35 is sucked into the compressor 36 through the four-way switching valve 38 and the accumulator 37.

As described above, in the heating operation, the indoor heat exchangers 21 to 24 (use side heat exchangers) function as radiators for the refrigerant to heat the inside of the rooms, and the outdoor heat exchanger 35 (heat source side heat exchanger) functions as an evaporator for the refrigerant.

(3) Control (3-1) Outline of Control System

Figure 2:
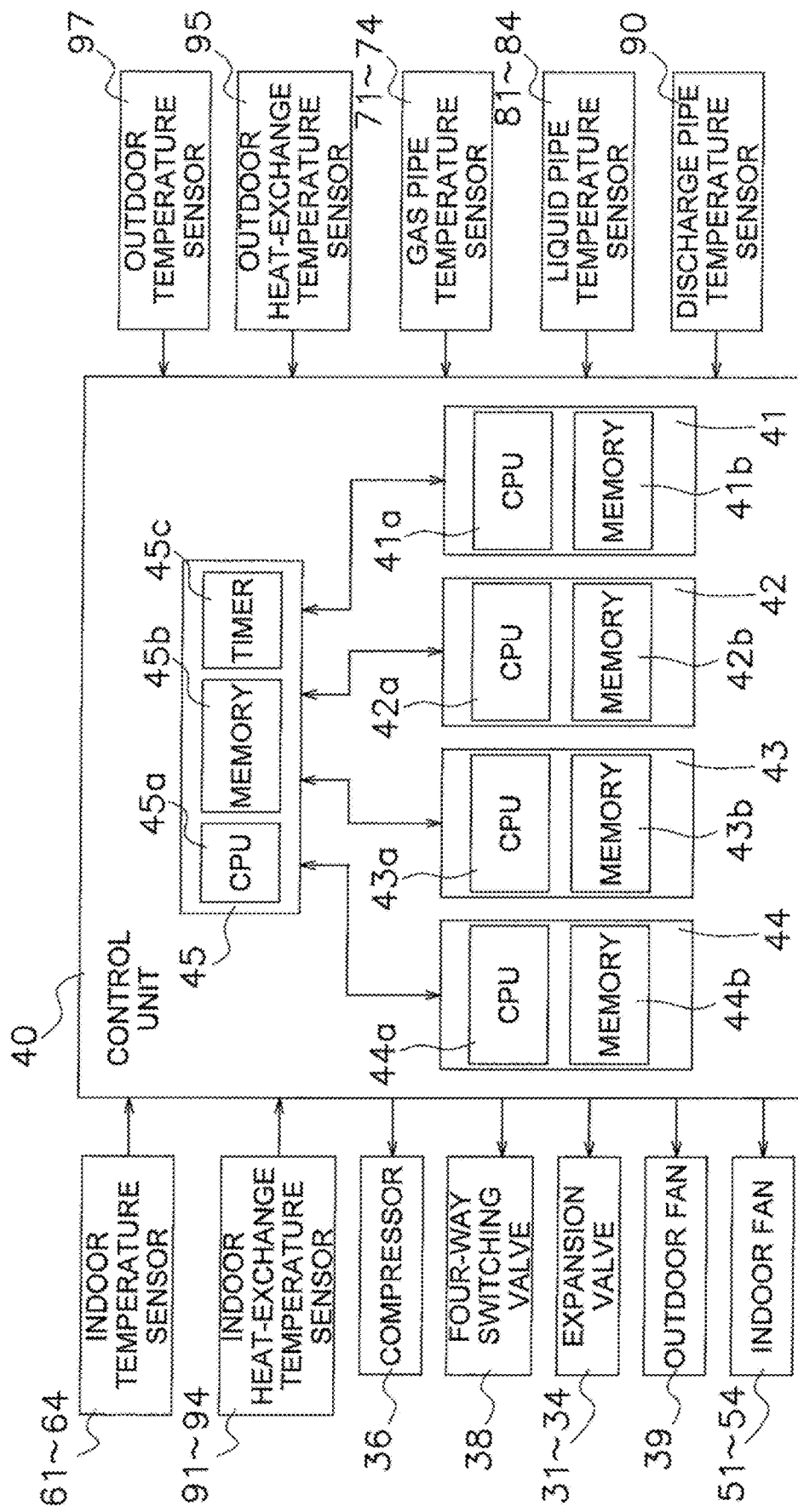
FIG. 2 is a block diagram illustrating a control system of the air conditioning apparatus.

FIG. 2 illustrates the outline of a control system of the air conditioning apparatus 1. The control unit 40 includes indoor control devices 41 to 44 and an outdoor control device 45. Specifically, a control board (corresponding to the outdoor control device 45) inside an electric component box (not illustrated) of the outdoor unit 19 and control boards (corresponding to the indoor control devices 41 to 44) inside electric component boxes (not illustrated) of the indoor units 11 to 14 are connected to constitute the control unit 40. The indoor control devices 41 to 44 respectively include CPUs 41*a* to 44*a* and memories 41*b* to 44*b*. The outdoor control device 45 includes a CPU 45*a*, a memory 45*b*, and a timer 45*c*. Programs and data for controlling the indoor units 11 to 14 and the outdoor unit 19 are described in the memories 41*b* to 45*b*. The CPUs 41*a* to 45*a* execute the programs described in the memories 41*b* to 45*b* to generate signals for controlling the respective devices. Further, each of the indoor units 11 to 14 is provided with a reception unit which receives a command of the corresponding one of remote controllers 111 to 114 operated and input by a user, a driver of a motor which changes the blow-out direction of air-conditioning air, and a display unit which displays the operating mode and the like.

As illustrated in FIG. 2, detection values of the respective temperature sensors described above are input to the control unit 40, and the cooling operation and the heating operation are controlled on the basis of these values.

(3-2) Cooling Operation Control

The control unit 40 controls the frequency of the compressor 36 and the valve opening degrees of the expansion valves 31 to 34 in the cooling operation. The control in the cooling operation is control as conventionally performed. Thus, description thereof will be omitted.

(3-3) Heating Operation Control

The control unit 40 performs starting control when the compressor 36 in a stopped state is started to start the heating operation, target discharge pipe temperature control and subcooling control for adjusting the valve opening degrees of the expansion valves 31 to 34 in a normal heating operation state in which the refrigerant state is stabilized after the start, capacity control of the compressor 36 in the normal heating operation state, control when a high-temperature air request is made, and defrosting control for melting frost adhered to the outdoor heat exchanger 35. Hereinbelow, the target discharge pipe temperature control, the subcooling control and the capacity control in the normal heating operation, and the high-temperature air control performed when a high-temperature air request is made, the control operations relating to the present invention, will be described.

(3-3-1) Target Discharge Pipe Temperature Control in Normal Heating Operation

In the target discharge pipe temperature control, the valve opening degrees of the expansion valves 31 to 34 are controlled using the discharge pipe temperature to indirectly perform superheating control on the suction side of the compressor 36, and manage the discharge temperature of the compressor 36 and manage the operation of the compressor 36 even when the refrigerant sucked by the compressor 36 is in a moist state. Even when the refrigerant sucked into the compressor 36 is in a moist state, the discharge pipe temperature control is performed within the bounds of not damaging the compressor 36, In the target discharge pipe temperature control in the normal heating operation state, the control unit 40 adjusts the valve opening degrees of the expansion valves 31 to 34 so that the discharge temperature To detected by the discharge pipe temperature sensor 90 approaches a target discharge pipe temperature Tm. To be precise, the temperature detected by the discharge pipe temperature sensor 90 is not the temperature of the refrigerant to be discharged, but the temperature of the discharge pipe of the compressor 36. Thus, it is preferred to correct the temperature detected by the discharge pipe temperature sensor 90 in some cases. However, in the present embodiment, description will be made assuming that the temperature detected by the discharge pipe temperature sensor 90 is equal to the temperature of the refrigerant to be discharged.

The control unit 40 sets the target discharge pipe temperature Tm on the basis of the evaporation temperature Te which is detected using the outdoor heat-exchange temperature sensor 95 and the condensation temperature Tc which is detected using each of the indoor heat-exchange temperature sensors 91 to 94. The target discharge pipe temperature Tm is a value that ensures a degree of discharge superheating of 10° C. or higher in a normal operation state.

The target discharge pipe temperature control causes the refrigerant to be sucked into the compressor 36 and discharged from the compressor 36 at a point (pressure and temperature) where the refrigeration cycle efficiency is high. The valve opening degree of the expansion valves 31 to 34 as a whole is adjusted by the target discharge pipe temperature control. On the other hand, the valve opening degree of each of the expansion valves 31 to 34 is adjusted according to a heating capacity required in each of the indoor units 11 to 14.

(3-3-2) Capacity Control of Compressor in Normal Heating Operation

The capacity control of the compressor 36 in the normal heating operation state increases or reduces the number of revolutions of the compressor 36 in accordance with a request from each of the indoor units 11 to 14. Specifically, the control unit 40 determines a required output of the compressor 36 and changes the number of revolutions of the compressor 36 on the basis of the difference between the indoor temperatures Tr1 to Tr4 which are detected by the indoor temperature sensors 61 to 64 of the indoor units 11 to 14 and set temperatures Ts1 to Ts4 which are set using the remote controllers 111 to 114.

(3-3-3) Subcooling Control in Normal Heating Operation

The subcooling control in the normal heating operation state corrects the valve opening degree of each of the expansion valves 31 to 34 determined by the target discharge pipe temperature control so that distribution of the refrigerant is appropriately performed in the hearing operation. The control unit 40 is capable of calculating degrees of subcooling SC1 to SC4 in the respective operation-ongoing-rooms using the liquid pipe temperatures Tl1 to Tl4 detected by the liquid pipe temperature sensors 81 to 84 and the condensation temperatures Tc1 to Tc4 detected by the indoor heat-exchange temperature sensors 91 to 94 in the operation-ongoing-rooms. For example, the degrees of subcooling SC1 to SC4 of the respective operation-ongoing-rooms can be obtained by subtracting the liquid pipe temperatures Tl1 to Tl4 from the condensation temperatures Tc1 to Tc4, respectively (e.g., SC1=Tc1−Tl1). In description of the present embodiment, the indoor units 11 to 14 are disposed on different rooms, specifically, the first to fourth rooms. The operation-ongoing-room indicates any of the first to fourth rooms where the corresponding one of the indoor units 11 to 14 is in an on-state of operation. On the other hand, any of the first to fourth rooms where the corresponding one of the indoor units 11 to 14 is in the off-state of operation is referred to as an operation-stopping-room.

In parallel with the above calculation of the degrees of subcooling SC1 to SC4, the control unit 40, for example, calculates a target degree of subcooling SCm using the number of revolutions fc of the compressor 36 and the temperature difference between the discharge temperature To and the target discharge pipe temperature Tm. For example, when the indoor unit 11 in the first room is in the on-state of operation, the degree of subcooling SC1 of the indoor unit 11 in the first room as the operation-ongoing-room is compared with the target degree of subcooling SCm to correct the valve opening degree of the expansion valve 31.

When the degree of subcooling SC1 of the first room is smaller than the target degree of subcooling SCm (SC1<SCm), the valve opening degree of the expansion valve 31 in the first room is increased.

When the degree of subcooling SC1 of the first room is larger than the target degree of subcooling SCm (SC1>SCm), the valve opening degree of the expansion valve 31 in the first room is reduced.

When the degree of subcooling SC1 of the first room is equal to the target degree of subcooling SCm (SC1=SCm), the valve opening degree of the expansion valve 31 in the first room is maintained as it is.

In order to expand the range where the valve opening degree is maintained, when the difference ΔSC between the degree of subcooling SC1 and the target degree of subcooling SCm falls within a predetermined range, the valve opening degree may be controlled to remain unchanged.

(4) High-Temperature Air Control

The high-temperature air control is started, for example, by operating a high-temperature air request operation button for requesting high-temperature air which is disposed on each of the remote controllers 111 to 114 by a user. When a request for high-temperature air is received, the high-temperature air control temporarily raises the temperature of hot air blown out through the first use side heat exchanger in the room where the indoor unit that receives the high-temperature air request is installed. In the following description, the room where the indoor unit that receives a request for high-temperature air is installed may be referred to as a high-temperature air room, and the room where the indoor unit that receives no request for high-temperature air may be referred to as another room.

For example, when a user operates the high-temperature air request operation button of the remote controller 114 to transmit a request for high-temperature air, the fourth room corresponds to the high-temperature air room, and the indoor heat exchanger 24 in the fourth room corresponds to the first use side heat exchanger. When a plurality of high-temperature air request operation buttons are operated in the remote controllers 111 to 114, a plurality of rooms may correspond to the high-temperature air rooms, and indoor heat exchangers in the high-temperature air rooms correspond to the first use side heat exchangers. Further, there is a case where it is not appropriate to perform the high-temperature air control even when a request is made. Thus, the control unit 40 may be configured to perform the high-temperature air control when one starting condition that the high-temperature air request operation button is pressed and another starting condition are both satisfied. Further, the high-temperature air control may be started by a method other than the method that operates the high-temperature air request operation buttons of the remote controllers 111 to 114. However, in order to simplify the description, in the present embodiment, the high-temperature air control is started when a user operates the high-temperature request operation buttons of the remote controllers 111 to 114. In the following description, the indoor heat exchanger in the room where the high-temperature air request operation button is pressed is referred to as a first use side heat exchanger. Further, the path to which the first use side heat exchanger is connected is referred to as a first refrigerant path, and the expansion valve located on the first refrigerant path is referred to as a first expansion valve. As described above, when the high-temperature air request operation button of the remote controller 114 is operated, the refrigerant path r4 corresponds to the first refrigerant path, and the expansion valve 34 corresponds to the first expansion valve.

The control unit 40, for example, counts an elapsed time from the start of high-temperature air control using the timer 45c and deactivates the high-temperature air control on the condition that the elapsed time has reached a preset time (e.g., 30 minutes). The control unit 40 deactivates the high-temperature control when the control unit 40 determines that it is not appropriate to continue the high-temperature air control. For example, when the power of the indoor unit 14 in the high-temperature air room is turned off in accordance with an instruction from the remote controller 114, there is no indoor unit that receives a request for high-temperature air. Thus, in such a case, the high-temperature air control is deactivated even when the count of the timer 45c has not reached the set time.

(4-1) Enhancement of Capacity for High-Temperature Air Control

When a high-temperature air request is received, the control unit 40 performs control for increasing a flow rate of the refrigerant flowing through the first use side heat exchanger. Specifically, when a high-temperature air request is received, the control unit 40 increases the number of revolutions of the compressor 36. The control unit 40, for example, adds a corrected value to the number of revolutions of the compressor 36 to make the number of revolutions of the compressor 36 larger than that before the high-temperature air request. Further, in order to increase the number of revolutions of the compressor 36 when a high-temperature air request is received, the control unit 40 may, for example, be configured to raise an upper limit value of the number of revolutions of the compressor 36.

When a high-temperature air request is received, the control unit 40 performs control for increasing a flow rate of outdoor air flowing through the heat source side heat exchanger. Specifically, when a high-temperature air request is received, the control unit 40 increases the number of revolutions of the outdoor fan 39. For example, when a high-temperature air request is received, the control unit 40 sets the number of revolutions of the outdoor fan 39 to a maximum value.

(4-2) Securing of Amount of Heat per Unit Volume of Air Passing through Heat Exchanger The control unit 40 performs control for limiting the volume of air blown out as hot air through the first use side heat exchanger that receives a high-temperature air request. In the present embodiment, the first use side fan sends air to the first use side heat exchanger in the high-temperature air room. Specifically, for example, when the high-temperature air request operation button of the remote controller 112 is operated, the control unit 40 limits a fan tap of the indoor fan 52 as the first use side fan to a tap of an airflow volume equal to or less than a preset tap. For example, when six stages of switching can be performed, the airflow volume of the indoor fan 52 is limited to the third smallest airflow volume or smaller. When the airflow volume is too small, it may be difficult for a user to have actual feeling of receiving high-temperature air. Thus, the airflow volume is set to an appropriate airflow volume that does not lower the temperature of hot air too much. Further, when the control unit 40 reduces the airflow volume, the control unit 40 controls the airflow volume so that the airflow volume is gradually reduced.

(4-3) Change of Valve Opening Degree of Expansion Valve

Figure 3A:
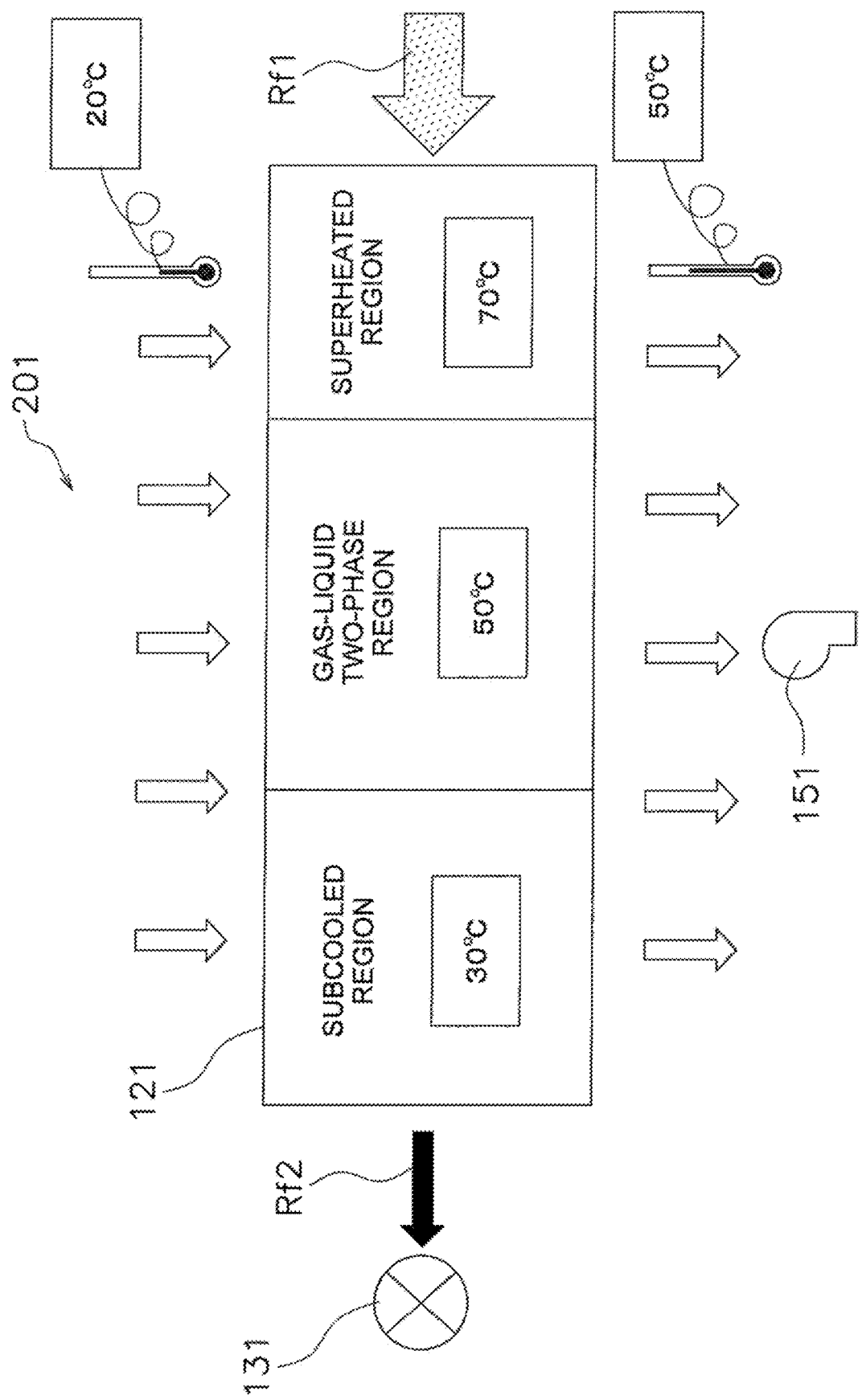
FIG. 3A is a schematic diagram for describing a state of a first use side heat exchanger before high-temperature air control.
Figure 3B:
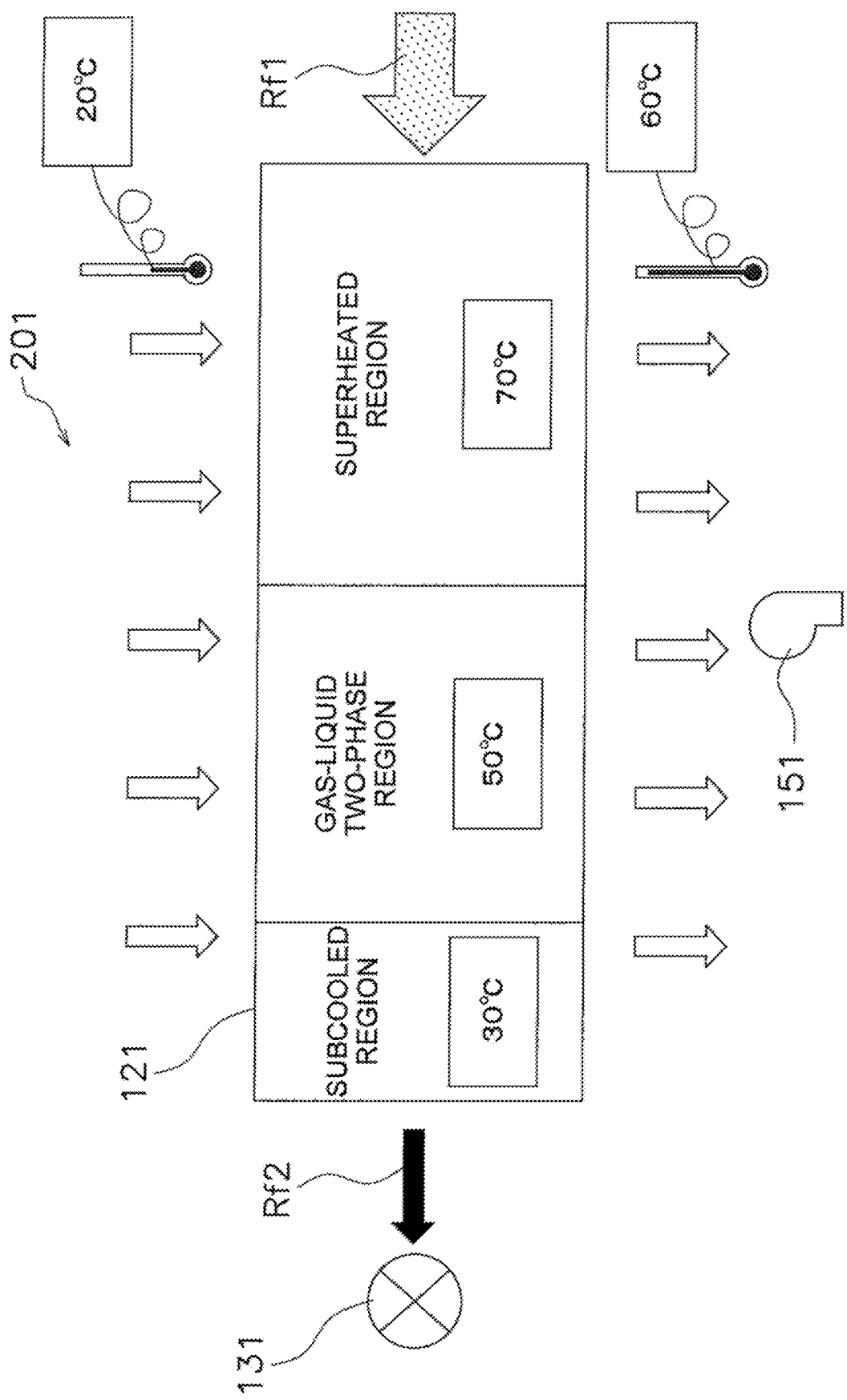
FIG. 3B is a schematic diagram for describing a state of the first use side heat exchanger after the high-temperature air control.
Figure 3C:
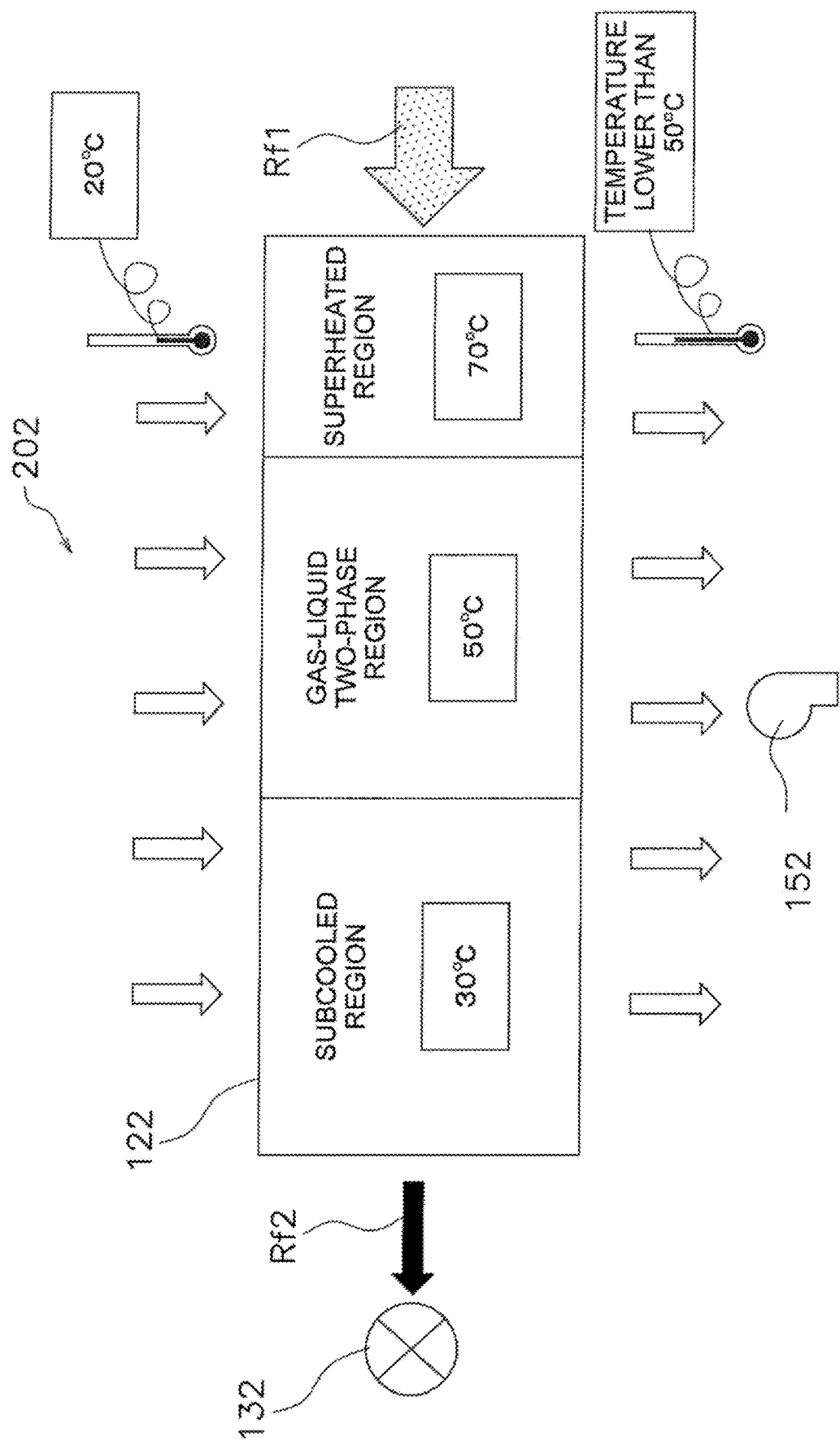
FIG. 3C is a schematic diagram for describing state of a second use side heat exchanger in an operation-ongoing-room after the high-temperature air control.
Figure 3D:
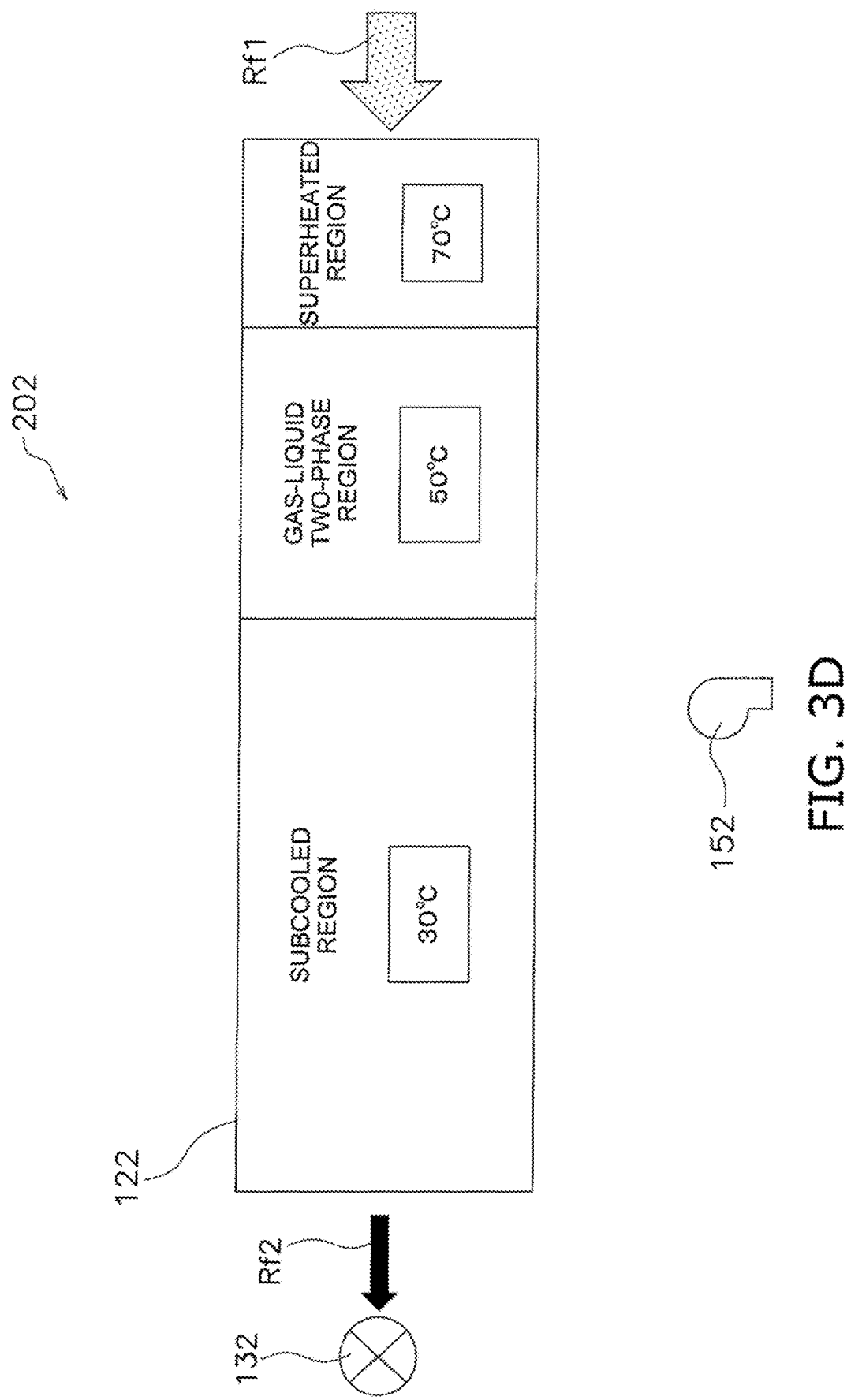
FIG. 3D is a schematic diagram for describing a state of the second use side heat exchanger in an operation-stopping-room after the high-temperature air control.

When a request for high-temperature air is received, the control unit 40 changes the control of the first expansion valve so that the temperature of the refrigerant flowing through the first use side heat exchanger in the high-temperature air room rises. In other words, the control unit 40 changes the valve opening degree of the first expansion valve so as to raise an average temperature of the first use side heat exchanger. Specifically, a superheated region before the high-temperature air control formed by a gas refrigerant Rf1 flowing into the first use side heat exchanger 121 as illustrated in FIG. 3A is increased as illustrated in FIG. 3B after the high-temperature control. Along with this, a subcooled region which is large as illustrated in FIG. 3A before the high-temperature air control becomes small as illustrated in FIG. 3B after the high-temperature air control. As a result, for example, although the first use side heat exchanger 121 raises the indoor temperature of 20° C. to 50° C. by heat exchange before the high-temperature air control, the first use side heat exchanger 121 can raise the indoor temperature of 20° C. to 60° C. by heat exchange after the high-temperature air control. On the other hand, as illustrated in FIG. 3C, in the second use side heat exchanger 122 of the second use unit 202 which receives no request for high-temperature air in the operation-ongoing-room, the subcooled region tends to be increased and the superheated region tends to be reduced after the high-temperature air control, and the temperature of hot air blown out of the second use side heat exchanger 122 tends to be lowered. Further, as illustrated in FIG. 3D, in the second use side heat exchanger 122 of the second use unit 202 which receives no request for high-temperature air in the operation-stopping-room, the second use side fan is stopped, and the subcooled region is further increased and the superheated region is further reduced after the high-temperature air control.

In FIGS. 3A to 3D, the refrigerant flowing out of the subcooled region is a liquid refrigerant Rf2. Further, although FIGS. 3A to 3D illustrate a case where the average temperature of the refrigerant in the superheated region is 70° C., the temperature of the refrigerant in a gas-liquid two-phase region is 50° C., and the temperature of the refrigerant in the subcooled region is 30° C., this case is a model for description, and an actual case does not necessarily correspond to this model. Further, in FIGS. 3A, 3B and 3C, the first expansion valve 131 expands the liquid refrigerant Rf2 flowing out of the first use side heat exchanger 121, the first use side fan 151 sends air to the first use side heat exchanger 121, the second expansion valve 132 expands the liquid refrigerant Rf2 flowing out of the second use side heat exchanger 122, and the second use side fan 152 sends air to the second use side heat exchanger 122.

(4-3-1) Change of Subcooling Control (4-3-1-1) Change of Target Degree of Subcooling in Operation Room When the first use side unit 201 including the first use side heat exchanger 121 illustrated in FIGS. 3A and 3B receives a request for high-temperature air, the control unit 40 performs control for lowering the target degree of subcooling SCm to increase the superheated region occupied by the gas refrigerant in the first use side heat exchanger 121 on the first use side unit 201 including the first use side heat exchanger 121. For example, the control unit 40 calculates the target degree of subcooling SCm in a manner similar to the calculation in the normal heating operation and then subtracts a predetermined value, which is previously set, from the target degree of subcooling SCm to calculate a target degree of subcooling SCmH for high-temperature air control. For example, the predetermined value may be a constant, a value calculated in accordance with a predetermined mathematical formula, or a value described in tables in the memories 41b to 45b. For example, it is assumed that the target degree of subcooling SCm in the normal heating operation is 12 degrees. In this case, when the four indoor units 11 to 14 are connected as illustrated in FIG. 1 and one of the four indoor units 11 to 14 receives a request for high-temperature air, the target degree of subcooling SCm of the indoor unit in the high-temperature air room where the request for high-temperature air is made is changed to the target degree of subcooling SCmH of 5 degrees. When there are two or more high-temperature air rooms where the request for high-temperature air is made, it is preferred to increase the target degree of subcooling SCmH in order to take the influence on another room into consideration and achieve an efficient operation as a whole. For example, when there is one high-temperature air room (when only one indoor unit receives a request for high-temperature air), the target degree of subcooling SCmH is 5 degrees. On the other hand, when there are two high-temperature air rooms (two indoor units receive a request for high-temperature air), the target degree of subcooling SCmH is set to 7 to 8 degrees in both the rooms. Further, when there are three high-temperature air rooms, the target degree of subcooling SCmH is set to 9 to 11 degrees in all of the rooms. That is, when a plurality of indoor units receive a request for high-temperature air, a reduction degree of the target degree of subcooling SCmH is preferably reduced as the number of indoor units receiving the request increases.

(4-3-1-2) Target Degree of Subcooling in Another Operation Room

The control unit 40 is configured to perform control for maintaining the target degree of subcooling SCm in the normal heating operation of the indoor unit that receives no request for high-temperature air. However, in order to further concentrate the capacity on the high-temperature air room, the control unit 40 may be configured to perform control for increasing the target degree of subcooling in the room where no request for high-temperature air is made. For example, when the indoor unit 11 receives a request for high-temperature air, and the indoor units 12 to 14 receive no request for high-temperature air, the target degree of subcooling SCm immediately before high-temperature air control is 12 degrees, the target degree of subcooling SCmH of the indoor unit 11 after the start of the high-temperature air control is 5 degrees, and the target degree of subcooling SCmH of the indoor units 12 to 14 is 13 degrees.

(4-3-1-3) Control of Indoor Unit in Stop Room

The control unit 40 performs not subcooling control, but target discharge pipe temperature control on the indoor unit in the operation-stopping-room. The target discharge pipe temperature control changes the valve opening degree of the expansion valve corresponding to the operation-stopping-room in the reducing direction. At this time, the indoor fan in the operation-stopping-room is in a stopped state. The liquid refrigerant by an amount reduced in the first use side heat exchanger 121 (refer to FIG. 3B) in the high-temperature air room where a request for high-temperature air is made is accumulated in the indoor heat exchanger in the operation-stopping-room by reducing the valve opening degree of the expansion valve. As a result, the distribution of the refrigerant in the air conditioning apparatus 1 as a whole is optimized, which enables an efficient heating operation to be continued. For example, the refrigerant circuit 2 may be provided with a reservoir which stores the refrigerant expelled from the first use side heat exchanger 121. However, storing a surplus refrigerant in the indoor heat exchanger in the operation-stopping-room as described above can avoid the addition of a device such as a reservoir.

Each of the indoor heat-exchange temperature sensors 91 to 94 respectively attached to the indoor heat exchangers 21 to 24 functions as an intermediate temperature sensor disposed between a refrigerant outlet and a refrigerant inlet of each of the indoor heat exchangers 21 to 24. For example, in a heating operation using the refrigerant path r1 as the second refrigerant path where no high-temperature air request is made for the indoor heat exchanger 21, the control unit 40 is configured to shift to protection control when the indoor unit 11 is in the on-state and the indoor heat-exchange temperature sensor 91 detects that the refrigerant has become a subcooled state, but not to shift to the protection control when the indoor unit 11 is in the off-state of operation. In this case, when the room where the indoor unit 11 is installed becomes the operation-stopping-room, the possibility that the indoor heat-exchange temperature sensor 91 detects the temperature of the liquid refrigerant increases because the liquid refrigerant tends to be accumulated in the indoor heat exchanger 21 as already described above. Such a configuration in which protection control is not performed even when the indoor heat-exchange temperature sensor 91 detects subcooling enables a large amount of refrigerant to be stored in the indoor unit 11 which receives no request for high-temperature air and is in the off-state of operation.

(4-3-2) Suppression of Operation off State of Indoor Unit with Request for High-Temperature Air A large amount of heat is supplied to indoor air in the high-temperature air room where the indoor unit that receives a request for high-temperature air is installed. Thus, the temperature in the high-temperature air room frequently exceeds a set temperature set by a user. Thus, if the heating operation is managed with a target of the set temperature set by a user, the indoor unit frequently repeats the on-state and the off-state of operation, which loses the comfort of the user. In order to prevent the repetition of the on-state and the off-state of operation, the control unit 40 automatically changes the set temperature of the indoor unit that blows out high-temperature air to a maximum value. The changed set temperature is returned to the set temperature set by the user by the control unit 40 at the end of the high-temperature air control.

(4-3-3) Acceleration of On-State of Operation of Indoor Unit with No Request for High-Temperature Air When it is assumed that the indoor unit 13 is the first use side unit where a request for high-temperature air is made, and the other indoor units 11, 12, 14 are the second use side units where no request for high-temperature air is made, the control unit 40 changes the turnoff condition of the indoor units 11, 12, 14 so as to facilitate becoming in the off-state of the heating operation using the refrigerant paths r1, r2, r4 as the second refrigerant paths. For example, before the start of high-temperature air control, the indoor units 11, 12, 14 in the other rooms are in the off-state of operation when differences $\Delta Td1$ ($=Tr1-Ts1$), $\Delta Td2$ ($=Tr2-Ts2$), $\Delta Td4$ ($=Tr4-Ts4$) between the set temperatures Ts1, Ts2, Ts4 and the indoor temperatures Tr1, Tr2, Tr4 are 3 degrees. On the other hand, the control unit 40 performs a change for relaxing the off condition so that the indoor units 11, 12, 14 become in the off-state of operation when the differences $\Delta Td1$, $\Delta Td2$, $\Delta Td4$ become 0 degree, that is, the set temperatures Ts1, Ts2, Ts4 become equal to the indoor temperatures Tr1, Tr2, Tr4. The change of the turnoff condition is not necessarily the same between the indoor units, and may differ between the indoor units. For example, the indoor unit 11 become in the off-state of operation when the difference $\Delta Td1$ become 0 degree, and the indoor unit 12 become in the off-state of operation when the difference $\Delta Td2$ become 1 degree.

(4-3-4) Airflow Volume Control of Indoor Unit with No Request for High-Temperature Air The temperature of hot air of the indoor unit (the first use side unit) installed in the high-temperature air room where a request for high-temperature air is made is affected by the airflow volume of the indoor unit (the second use side unit) in another room where no request for high-temperature air is made. Further, when the second use side unit repeats the on-state and the off-state of operation during high-temperature air control, the refrigerant pressure on the high-pressure side in the refrigeration cycle is not stabilized, which results in hunting of the temperature of hot air blown out of the first use side unit.

When it is assumed that the indoor unit 13 is the first use side unit where a request for high-temperature air is made and the other indoor units 11, 12, 14 are the second use side units in the other rooms, a shift to a high-temperature air mode that performs control so as to reduce the airflow volumes of the indoor fans 51, 52, 54 as the second use side fans or make the airflow volumes of the indoor fans 51, 52, 54 zero is made.

Specifically, when a high-pressure saturation temperature (the detection temperature of the indoor heat-exchange temperature sensors 91 to 94) is not equal to or higher than a certain temperature (Tp1° C.), the control unit 40 reduces the airflow volumes of the indoor fans 51, 52, 54 in stages. A pressure sensor may be used as each of the indoor heat-exchange temperature sensors 91 to 94, and a high-pressure refrigerant pressure detected by the pressure sensor may be converted to a pressure corresponding saturation temperature. When each of the indoor heat-exchange temperature sensors 91 to 94 is a temperature sensor such as a thermistor, there is a possibility that the degree of subcooling cannot be correctly detected. The control accuracy can be improved by converting the voltage value of the high-pressure refrigerant to the high-pressure saturation temperature in this manner.

Figure 4:
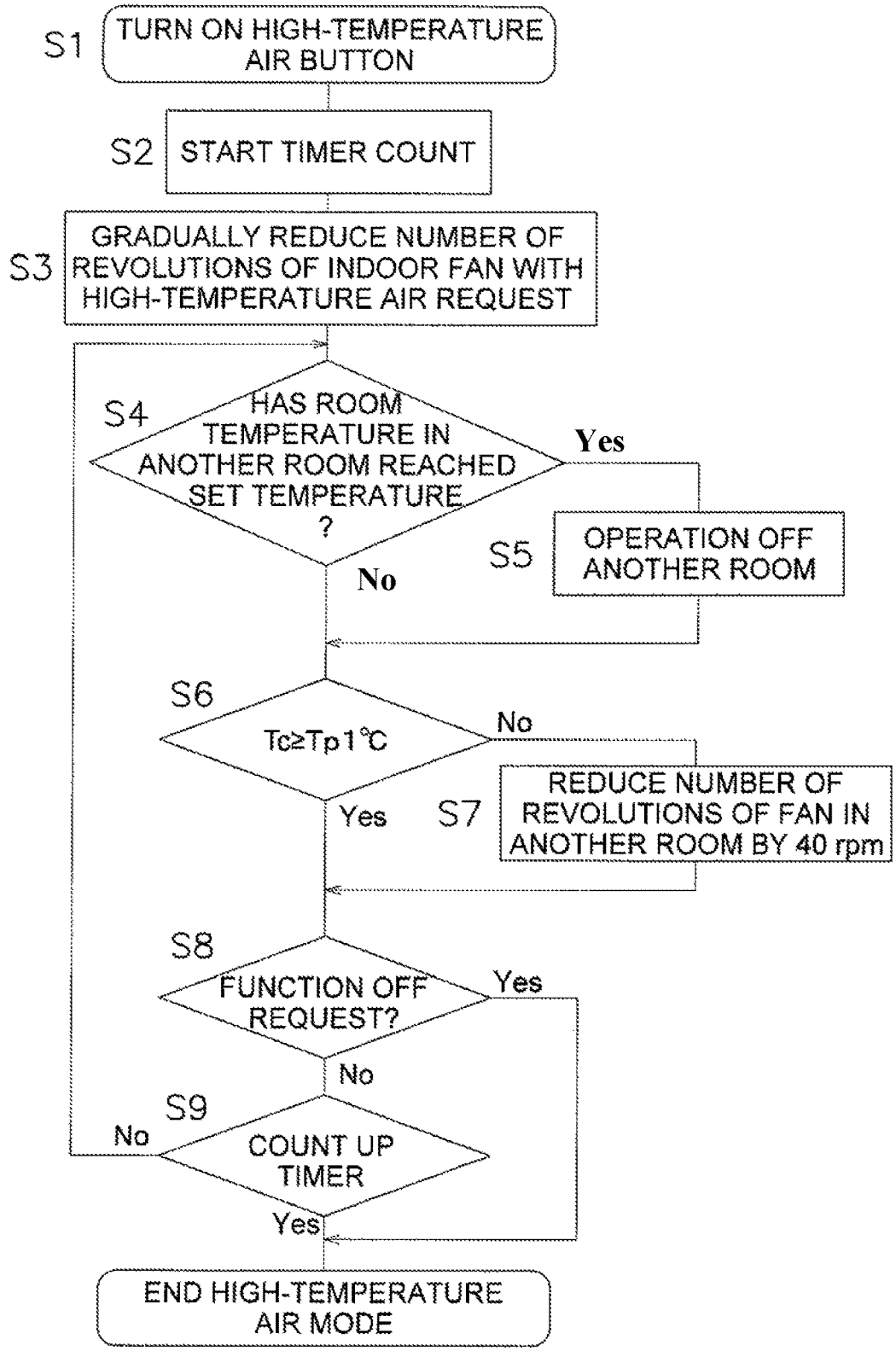
FIG. 4 is a flowchart for describing control of an indoor unit in another room.

The control of the indoor units 11, 12, 14 in the other rooms will be described with reference to a flowchart of FIG. 4. First, when a request for high-temperature air is transmitted from the indoor unit 13 to the control unit 40 by operating the high-temperature air request operation button of the remote controller 113, high-temperature air control is started (step S1). Upon the start of the high-temperature air control, the control unit 40 starts count by the timer 45c (step S2). Then, as described in the above (4-2), the control unit 40 gradually reduces the number of revolutions of the indoor fan 53 of the indoor unit 13 in the high-temperature air room (step S3). The control unit 40, for example, reduces the number of revolutions of the indoor fan 53 by 100 to 200 rpm per minute.

Then, as described in the above (4-3-3), the turnoff condition is changed. Before the change, stopping of heating is not performed when the indoor temperatures Tr1, Tr2, Tr4 are not higher than the set temperatures Ts1, Ts2, Ts4 by 3 degrees or more. However, after the change of the turnoff condition, it is determined whether to perform stopping of heating according to whether the indoor temperatures Tr1, Tr2, Tr4 are equal to the set temperatures Ts1, Ts2, Ts4 (step S4). For example, when the indoor temperature Tr4 has reached the set temperature Ts4, the indoor unit 14 enter the off-state of operation (step S5). Step S3 and steps S4, S5 may be parallely performed, or step S3 may be performed after performing steps S4, S5 first.

At this point, the indoor unit 14 is in the off-state of operation. On the other hand, the indoor units 11, 12 are in the on-state of operation, and the indoor fans 51, 52 are driven. The control unit 40 determines whether the high-pressure corresponding saturation temperature (the condensation temperature Tc (e.g., the condensation temperature Tc1)) is equal to or higher than the certain temperature Tp1 (step S5). When the high-pressure corresponding saturation temperature is lower than the certain temperature Tp1, the control unit 40 reduces the number of revolutions of the indoor fans 51, 54 by 40 rpm (step S7). In this case, Tp1 is, for example, approximately forty and several degrees Celsius. In the present embodiment, step S8 is performed following step S7. However, the determination of step S6 may be performed again following step S7.

When the high-pressure corresponding saturation temperature becomes equal to or higher than Tp1, the process returns to step S4 to repeat the above operation in order to continue the high-temperature air mode unless a request to turn off the high-temperature air control function is made (step S8) or the timer 45c counts up (step S9). When the request to turn off the high-temperature air control function is made (step S8) or the timer 45c counts up (step S9), the high-temperature air mode is ended.

(5) Modifications (5-1) Modification A

In the above embodiment, the present invention is applied to the multi-room air conditioning apparatus 1 in which four pairs of connection ports for liquid and gas pipes to which the four indoor units 11 to 14 can be connected are disposed on the outdoor unit 19 so that two to four indoor units can be connected to the outdoor unit 19. However, the present invention is also applicable to an air conditioning apparatus in which five indoor units in maximum can be connected to one outdoor unit. The present invention is also applicable to an air conditioning apparatus in which three indoor units in maximum can be connected to one outdoor unit.

Further, the present invention may be applied to a pair-type air conditioning apparatus in which one indoor unit is connected to one outdoor unit.

(5-2) Modification B

In the above embodiment, the present invention is applied to the air conditioning apparatus 1 capable of switching the cooling operation and the heating operation. However, the present invention is also applicable to another refrigeration apparatus, for example, an air conditioning apparatus exclusive for heating.

(5-3) Modification C

Figure 5:
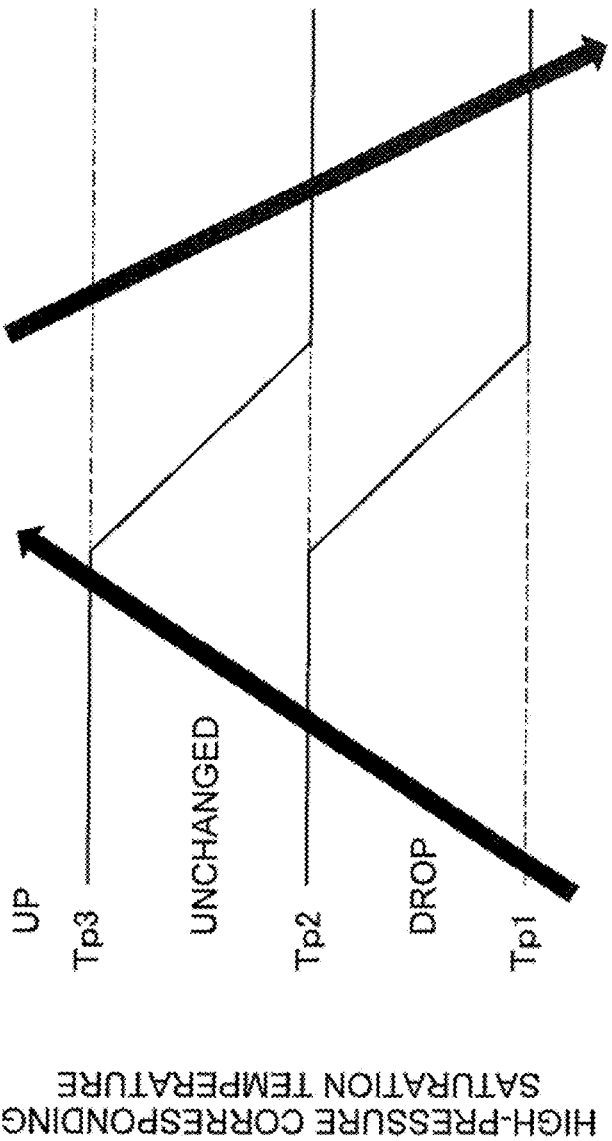
FIG. 5 is an explanatory diagram illustrating an example of the relationship between a high-pressure corresponding saturation temperature and setting of a fan tap.

In the above embodiment, as described above with reference to FIG. 4, when a shift to the high-temperature air mode is made, control for reducing the number of revolutions of the fan in another room is performed. However, when a shift to the high-temperature air mode that performs control so as to reduce the fan airflow volume in another operation-ongoing-room or make the fan airflow volume in another operation-ongoing-room zero is made, an upper limit fan tap in another operation-ongoing-room may be lowered. As described above with reference to FIG. 4 in the embodiment, when the indoor units 11, 12 are present in the other operation-ongoing-rooms, the control unit 40, for example, changes the upper limit fan tap of the indoor fans 51, 52 as illustrated in FIG. 5 on the basis of, for example, the high-pressure corresponding saturation temperature (the condensation temperature Tc (the condensation temperature Tc3)) of the indoor heat exchanger 23. That is, in step S6, it is determined whether the high-pressure corresponding saturation temperature falls within a drop zone in FIG. 5, an unchanged zone, or an up zone. When the high-pressure corresponding saturation temperature falls within the drop zone, the control unit 40 lowers the upper limit fan tap of the indoor fans 51, 52 by one tap in step S7 and then performs the determination of step S8. When the high-pressure corresponding saturation temperature falls within the unchanged zone, the control unit 40 directly performs the determination of step S8. When the high-pressure corresponding saturation temperature falls within the up zone, the control unit 40 performs the determination of step S8 after raising the upper limit fan tap by one tap.

According to the method of the determination illustrated in FIG. 5, it is determined that, when the high-pressure corresponding saturation temperature rises, the high-pressure corresponding saturation temperature falls within the drop zone until the high-pressure corresponding saturation temperature becomes Tp2 or higher, falls within the unchanged zone when the high-pressure corresponding saturation temperature is Tp2 or higher and lower than Tp3, and falls within the up zone when the high-pressure corresponding saturation temperature is Tp3 or higher. Further, it is determined that, when the high-pressure corresponding saturation temperature drops, the high-pressure corresponding saturation temperature falls within the up zone until the high-pressure corresponding saturation temperature becomes Tp2 or lower, falls within the unchanged zone until the high-pressure corresponding saturation temperature becomes Tp1 or lower, and falls within the drop zone when the high-pressure corresponding saturation temperature becomes Tp1 or lower. Note that Tp2 is, for example, several degrees higher than Tp1, and Tp3 is, for example, several degrees higher than Tp2.

(5-4) Modification D

In the above embodiment, as described in (4-3-1-1), the control of the first expansion valve is changed so as to raise the temperature of the refrigerant flowing through the first use side heat exchanger by changing the target degree of subcooling SCm of the indoor unit in the high-temperature air room in the subcooling control. However, the valve opening degree of the first expansion valve of the indoor unit in the high-temperature air room may be corrected to raise the temperature of the refrigerant flowing through the first use side heat exchanger. For example, the valve opening degree of the first expansion valve of the indoor unit in the high-temperature air room may be fixed at a certain valve opening degree which is previously set. In this manner, the control of the first expansion valve performed to raise the temperature of the refrigerant flowing through the first use side heat exchanger is not limited to the change of the target degree of subcooling SCm.

(5-5) Modification E

The above embodiment describes an example in which the target discharge pipe temperature control which indirectly controls the superheating degree on the suction side of the compressor 36 is performed. However, the present invention is also applicable to an air conditioning apparatus that directly controls the superheating degree on the suction side.

(6) Characteristics

In the following description of characteristics, in order to facilitate understanding of the description, there will be described an example in which the indoor unit 11 receives a request for high-temperature air from the remote controller 111, and the indoor units 12 to 14 receive no request for high-temperature air.

(6-1)

When the air conditioning apparatus 1 is in a state of the above example set as described above, the indoor unit 11 in the high-temperature air room serves as the first use side unit, the indoor heat exchanger 21 serves as the first use side heat exchanger, the indoor units 12 to 14 in the other rooms serve as the second use side units, the indoor heat exchangers 22 to 24 serve as the second use side heat exchangers, and the indoor fans 52 to 54 serve as the second use side fans. When the control unit 40 performs high-temperature air control, the control unit 40 shifts to the mode that performs the control so as to reduce the airflow volumes of the indoor fans 52 to 54 or make the airflow volumes of the indoor fans 52 to 54 zero. Thus, the amount of heat consumed in the indoor heat exchangers 22 to 24 is reduced. As a result, it is possible to supply a larger amount of heat than that in the normal heating operation to hot air whose heat is exchanged in the indoor heat exchanger 21 in the high-temperature air room and blown out to sufficiently raise the temperature of hot air blown out of the indoor unit 11 which receives the request for high-temperature air.

(6-2)

In the example set as described above, as described in Modification C, in the high-temperature air control, when the control unit 40 lowers the upper limit fan tap of the indoor units 12 to 14 in the other rooms, the airflow volumes are reduced at the timing when the upper limit fan tap is lowered in a case where the indoor fans 52 to 54 send air at the fan tap higher than the lowered upper limit fan tap until the upper limit fan tap is lowered. Further, in a case where the indoor fans 52 to 54 send air at the tap lower than the lowered upper limit fan tap, but higher than the upper limit fan tap lowered thereafter, it can be still considered that the airflow volumes of the indoor fans 52 to 54 are reduced. Such a configuration makes it possible to reduce the airflow volume while avoiding a sudden change and leaving a possibility capable of changing the fan tap and prevent reduction in the comfort caused by the difference in airflow volume control by bringing the control of the airflow volumes of the indoor fans 52 to 54 close to normal control.

(6-3)

In the example set as described above, as described above with reference to the flowchart of FIG. 4, the number of revolutions of the indoor fans 52 to 54 in the other rooms is reduced, which makes it possible to immediately reduce the airflow volumes of the indoor fans 52 to 54. Thus, it is possible to promptly concentrate the amount of heat on the indoor heat exchanger 21 in the high-temperature air room by reducing the amount of heat of the indoor heat exchangers 22 to 24.

(6-4)

In the example set as described above, it is possible to reduce the airflow volumes of the indoor fans 52 to 54 as the second use side fans in the other rooms while avoiding a sudden change by gradually reducing the airflow volumes. For example, in the example described above with reference to the flowchart of FIG. 4, the airflow volume is lowered by 40 rpm every time step S7 is performed. Thus, the airflow volume is lowered not at once, but in stages. As a result, it is possible to prevent reduction in the comfort caused by difficulty in raising the temperatures in the heating operation of the indoor units 12 to 14 in the other rooms where no request for high-temperature air is made.

(6-5)

In the example set as described above, when the condensation temperature of the indoor heat exchanger 21 as the first use side unit in the high-temperature air room is not lower than the predetermined threshold, the airflow volumes of the indoor fans 52 to 54 in the other rooms are maintained. Thus, it is possible to reduce the influence on users of the indoor units 12 to 14 by lowering the airflow volumes of the indoor fans 52 to 54. As a result, it is possible to prevent reduction in the comfort caused by difficulty in raising the temperatures in the heating operation of the indoor units 12 to 14 in the other rooms.

(6-6)

In the example set as described above, as described in the above (4-3-3), the control unit 40 changes the turnoff condition of the indoor units 12 to 14 in the refrigerant paths r2 to r4 so as to facilitate becoming in the off-state of operation of the indoor units 12 to 14 in the other rooms connected to the refrigerant paths r2 to r4 (examples of the second refrigerant path where no request for high-temperature air is made) where no request for high-temperature air is made. Since the indoor unit 12 in the other room is in an on-state of operation, and the indoor units 13, 14 in the other rooms are in an off-state of operation, the turnoff condition may be changed only in the indoor unit 12. However, when the indoor units 13, 14 are in the off-state of operation in the heating operation, it is expected that the indoor units 13, 14 will enter the off-state of operation sooner or later when the indoor temperatures Tr3, Tr4 drop. Thus, it is possible to stop heating within a short period of time when becoming in the on-state of operation is executed later by changing the turnoff condition of the indoor units 13, 14 in the other rooms in an off-state of operation to facilitate becoming in the off-state of operation. In this manner, when an off period of the heating operation using the indoor units 12 to 14 in the other rooms in the refrigerant paths r2 to r4 is increased to facilitate the accumulation of the refrigerant in the refrigerant paths r2 to r4, it is possible to appropriately distribute the refrigerant of the air conditioning apparatus 1 even when the subcooled region is reduced and the superheated region is increased in the indoor heat exchanger 21 in the high-temperature air room in the refrigerant path r1. Accordingly, the air conditioning apparatus 1 is capable of maintaining an efficient operation state.

(6-7)

In the example set as described above, when the condensation temperature of the indoor heat exchanger 21 as the first use side heat exchanger in the high-temperature air room is not lower than the predetermined threshold, the airflow volumes of the indoor fans 52 to 54 in the other rooms are maintained. Thus, it is possible to reduce the influence on users of the indoor units 12 to 14 in the other rooms by lowering the airflow volumes of the indoor fans 52 to 54. Such a configuration enables the air conditioning apparatus 1 to accelerate a rise in the temperature of hot air blown out of the indoor heat exchanger 21 in the high-temperature air room.

(6-8)

In the example set as described above, when a request for high-temperature air is received, the airflow volume of the indoor fan 51 as the first use side fan is made equal to or less than the predetermined value. Accordingly, the amount of air passing through the indoor heat exchanger 21 as the first use side heat exchanger in the high-temperature air room per unit time is reduced as compared to the case where the airflow volume exceeds the predetermined value, which increases the amount of heat received by air per unit volume.

(6-9)

In the example set as described above, the number of revolutions of the compressor 36 is increased to increase the flow rate of the refrigerant flowing through the indoor heat exchanger 21 in the high-temperature air control. Thus, it is possible to supply a larger amount of heat from the refrigerant to air passing through the indoor heat exchanger 21, combined with a rise in the temperature of the refrigerant flowing through the indoor heat exchanger 21 by a change of the control of the expansion valve 31.

(6-10)

In the example set as described above, the superheated region of the indoor heat exchanger 21 is increased as increased in the first use side heat exchanger 121 illustrated in FIG. 3B by the target degree of subcooling SCmH of the indoor unit 11 in the high-temperature air room, the target degree of subcooling SCmH being lowered by the control unit 40 in response to a request for high-temperature air. Accordingly, it is possible to increase the superheated region occupied by the high-temperature gas refrigerant in the indoor heat exchanger 21 and increase the amount of heat received by air passing through the indoor heat exchanger 21 to sufficiently raise the temperature of hot air blown out by the indoor unit 11 in the high-temperature air room.

The embodiment of the present disclosure has been described above. It should be understood that the above modes and details can be variously modified without departing from the gist and range of the present disclosure described in the claims.

REFERENCE SIGNS LIST

1 air conditioning apparatus
2 refrigerant circuit
11 to 14 indoor unit
21 to 24 indoor heat exchanger
31 to 34 expansion valve
35 outdoor heat exchanger (example of heat source side heat exchanger)
36 compressor
39 outdoor fan (example of heat source side fan)
40 control unit
51 to 54 indoor fan
91 to 94 indoor heat-exchange temperature sensor
121 first use side heat exchanger
122 second use side heat exchanger
131 first expansion valve
132 second expansion valve
151 first use side fan
152 second use side fan
201 first use side unit
202 second use side unit

CITATION LIST

Patent Literature

[Patent Literature 1] JP 4-4645 Y

The invention claimed is:

1. An air conditioning apparatus comprising:
a first use side unit including a first use side heat exchanger and a first use side fan configured to send air in a space to be air conditioned to the first use side heat exchanger;
a second use side unit including a second use side heat exchanger and a second use side fan configured to send air in a space to be air conditioned to the second use side heat exchanger;
a first expansion valve connected to a first refrigerant path extending through the first use side heat exchanger;
a second expansion valve connected to a second refrigerant path extending through the second use side heat exchanger;
a heat source side heat exchanger configured to perform heat exchange of a refrigerant flowing through the first refrigerant path and the second refrigerant path;
a compressor configured to compress the refrigerant whose heat is exchanged in the heat source side heat exchanger and discharge the compressed refrigerant to the first refrigerant path and the second refrigerant path; and
a controller configured to determine that a request for increased temperature air that temporarily raises a temperature of hot air blown out through the first use side heat exchanger is received, and that a request for increased temperature air that temporarily raises a temperature of hot air blown out through the second use side heat exchanger is not received,
wherein the controller is configured to shift the air conditioning apparatus to a mode that performs a control so as to one of reduce an airflow volume of the second use side fan and make the airflow volume of the second use side fan zero, in response to the controller detecting that the request for increased temperature of the hot air blown through the first use side heat exchanger is received, and the request for increased temperature of the hot air blown through the second use side heat exchanger is not received.

2. The air conditioning apparatus according to claim 1, wherein the airflow volume of the second use side fan is reduced by lowering an upper limit fan tap of the second use side fan in the mode.

3. The air conditioning apparatus according to claim 1, wherein the airflow volume of the second use side fan is reduced by reducing the number of revolutions of the second use side fan in the mode.

4. The air conditioning apparatus according to claim 1, wherein the airflow volume of the second use side fan is reduced in stages in the mode.

5. The air conditioning apparatus according to claim 1, wherein the airflow volume of the second use side fan is maintained when a condensation temperature of the first use side heat exchanger is not lower than a predetermined threshold in the mode.

6. The air conditioning apparatus according to claim 1, wherein, when the request for the increased-temperature air blown out through the first use side heat exchanger is received and the request for the increased-temperature air blown out through the second use side heat exchanger is not received in the mode, the controller is configured to change a turnoff condition of a heating operation of the second use side unit using the second refrigerant path, to facilitate becoming in an off-state of the heating operation.

7. The air conditioning apparatus according to claim 6, wherein, in the mode, the heating operation of the second use side unit using the second refrigerant path, where no request for the increased-temperature air is received, is preferentially made in the off-state of operation, and the airflow volume of the second use side fan, in the second refrigerant path not made in the off-state of operation, is reduced.

8. The air conditioning apparatus according to claim 1, wherein control for making an airflow volume of the first use side fan equal to or less than a predetermined value is performed when a request for the increased-temperature air is received.

9. The air conditioning apparatus according to claim 1, wherein control for increasing the number of revolutions of the compressor to increase a flow rate of the refrigerant flowing through the first use side heat exchanger is performed when a request for the increased-temperature air is received.

10. The air conditioning apparatus according to claim 1, wherein control for lowering a target degree of subcooling to increase a superheated region occupied by a gas refrigerant in the first use side heat exchanger is performed when a request for the increased-temperature air is received.

* * * * *